Figure 1:
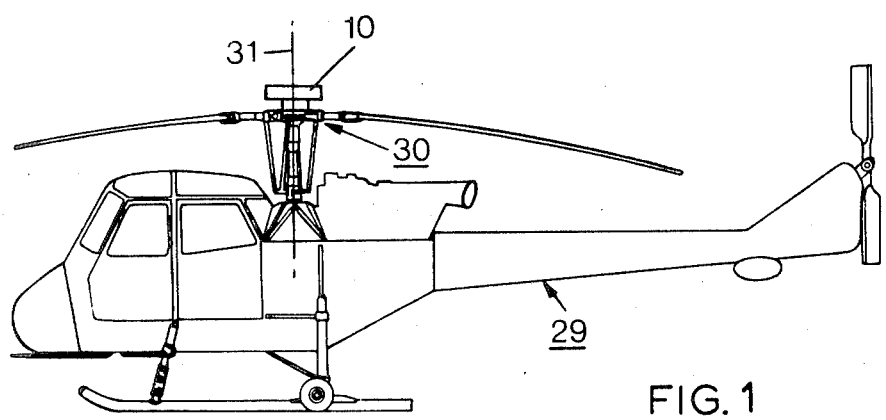

United States Patent [19]

Vincent et al.

[11] 4,225,287
[45] Sep. 30, 1980

[54] VIBRATION ABSORBER FOR HELICOPTER

[75] Inventors: Alan H. Vincent, East Coker; Stephen P. King, Stoke-sub-Hamdon, both of England

[73] Assignee: Westland Aircraft Limited, Yeovil, England

[21] Appl. No.: 957,853

[22] Filed: Nov. 6, 1978

Related U.S. Application Data

[62] Division of Ser. No. 761,310, Jan. 21, 1977, Pat. No. 4,145,936.

[51] Int. Cl.³ .................... B64C 27/06; F16C 15/00
[52] U.S. Cl. ..................................... 416/145; 416/500
[58] Field of Search ................... 416/144, 145, 500; 74/574, 572, 573

[56] References Cited

U.S. PATENT DOCUMENTS

| | | | |
|---|---|---|---|
| 3,219,120 | 11/1965 | Hooper | 416/145 |
| 3,387,505 | 6/1968 | Rumsey | 416/145 X |
| 3,910,720 | 10/1975 | Vincent et al. | 416/145 |
| 4,044,628 | 8/1977 | Jacks | 416/145 X |
| 4,145,936 | 3/1979 | Vincent et al. | 416/500 X |

Primary Examiner—Everette A. Powell, Jr.
Attorney, Agent, or Firm—Larson, Taylor and Hinds

[57] ABSTRACT

A vibration absorber for a helicopter rotor includes a hub portion, a mass portion encircling the hub portion and a plurality of resilient arms extending in a spaced-apart spiral pattern between the hub and the mass. In operation, the hub portion of the vibration absorber is mounted on a helicopter rotor so as to be rotated with the rotor about an axis of rotation of the rotor, the resilient arms ensuring that the mass is capable of equal resilient deflection in any direction within its plane of rotation whereby the vibration absorber simultaneously reduces in-plane vibration forces of different frequencies.

7 Claims, 5 Drawing Figures

VIBRATION ABSORBER FOR HELICOPTER

This is a division of application Ser. No. 761,310 filed Jan. 21st, 1977, now U.S. Pat. No. 4,145,936, issued on Mar. 27, 1979.

This invention relates to helicopters, and particularly to helicopters having vibration absorbers for cancelling or substantially reducing in-plane (horizontal) vibration forces active on a helicopter rotor.

The troublesome in-plane forces comprise $(n-1)$ frequency vibrations and $(n+1)$ frequency vibrations. By $(n-1)$ vibrations we mean the vibrations which oscillate at a frequency equal to the number of blades (n) minus 1 times rotor rpm, i.e. $(n-1) \times$ rotor rpm, and by $(n+1)$ vibrations we mean the vibrations which oscillate at a frequency equal to the number of blades (n) plus 1 times rotor rpm, i.e. $(n+1) \times$ rotor rpm. Taking a four-bladed rotor as an example, these vibrations are also sometimes referred to as 3 R and 5 R vibrations.

A prior arrangement for reducing in-plane vibration forces consists of a bifilar vibration damper assembly as disclosed in U.S. Pat. No. 3,540,809. In that arrangement, a single bifilar assembly consists of at least three bifilar dampers and can only be tuned to cancel either the $(n-1)$ or $(n+1)$ vibrations. It follows therefore that to cancel both the $(n-1)$ and the $(n+1)$ vibrations at least six bifilar dampers are necessary, three of which are tuned to the $(n-1)$ vibrations and the remaining three are tuned to the $(n+1)$ vibrations. This results in an increase in mechanical complexity, weight and maintenance procedures, and has an adverse effect on performance because of increased drag.

Furthermore, the centre of gravity of the bifilar dampers is restrained to rotate in a circular path concentric with the axis of rotation of the rotor. This means that, whether tuned to either $(n-1)$ or $(n+1)$ vibrations the assembly is capable only of cancelling force vectors of one particular phase and magnitude (i.e. is capable only of cancelling a force which is itself circular), and may, in some instances, actually induce an out of balance force at the rotor head.

U.S. Pat. No. 3,910,720 (assigned to the assignee of the present invention), discloses a vibration absorber comprising a circular mass supported from a hub portion by resilient support means so as to be capable of oscillation in any direction within its plane of rotation. This prior absorber is capable of cancelling both $(n-1)$ and $(n+1)$ frequency vibrations of a helicopter rotor in a single installation, and unequal force vectors can be effectively cancelled with no possibility of inducing an out of balance force at the rotor head as is the case in the aforementioned bifilar installations. Thus, both of the aforementioned problem areas encountered in bifilar installations are effectively overcome by the vibration absorber disclosed in U.S. Pat. No. 3,910,720, however, this design suffers from mechanical complexity caused by the use of coil springs and sliding surfaces interconnecting the hub portion and the mass, and performance is liable to suffer due to de-tuning of the absorber caused by frictional limitations and wear.

It is therefore an object of the present invention to provide an in-plane vibration absorber for a helicopter which retains the operational advantages of the aforementioned absorber and in which the limitations caused by constructional features of that absorber are overcome.

Accordingly, the present invention provides a helicopter including a rotor system having a plurality of rotor blades arranged for rotation about a generally vertical axis, a vibration absorber associated with the rotor system and comprising a hub portion arranged for rotation with the rotor system about the axis of rotation, a mass portion encircling the hub portion, and a plurality of resilient arms joining the hub and mass portions, the arms extending in a spaced-apart spiral pattern so that during operation the mass is rotated with the rotor system substantially perpendicular to the axis of rotation of the rotor system, whereby the mass is capable of substantially equal resilient deflection in any direction within its plane of rotation, the absorber being tuned so as to have, at a selected rotor design speed, a translational or in-plane natural frequency corresponding to the frequencies at which vibration absorption is required, thereby reducing in-plane rotor induced vibrations.

The vibration absorber may be tuned, in a non-rotating condition to a frequency equal to $(n) \times$ rotor rpm at the selected rotor design speed so as to reduce both $(n-1)$ and $(n+1)$ frequency vibrations.

The hub portion of the vibration absorber may have slots formed therein and openings disposed in its periphery corresponding in number to the number of arms. The arm material may be extended through the slots and interconnected with adjacent arms whereby all of the resilient arms are interconnected.

Preferably, the arms of the absorber are constructed of fibre-reinforced plastics material.

In one form of the invention, each resilient arm comprises at least two superimposed layers arranged in a stacked assembly. In such an arrangement, each layer may extend from an individual hub centre having a ring of symmetrical bolt holes for attachment of the stacked hub centres to each other and a locating spigot may extend through a central aperture in each of the stacked hub centres. The spigot may have a flange portion with a ring of bolt holes corresponding to the holes in the hub centres for securement of the spigot to the stacked hub centres.

The spigot may have a location boss concentric of the axis of rotation of the absorber for location in a recess in the helicopter rotor and said ring of bolt holes may, conveniently, provide a means of attachment of the absorber to the helicopter rotor.

Figure 2:
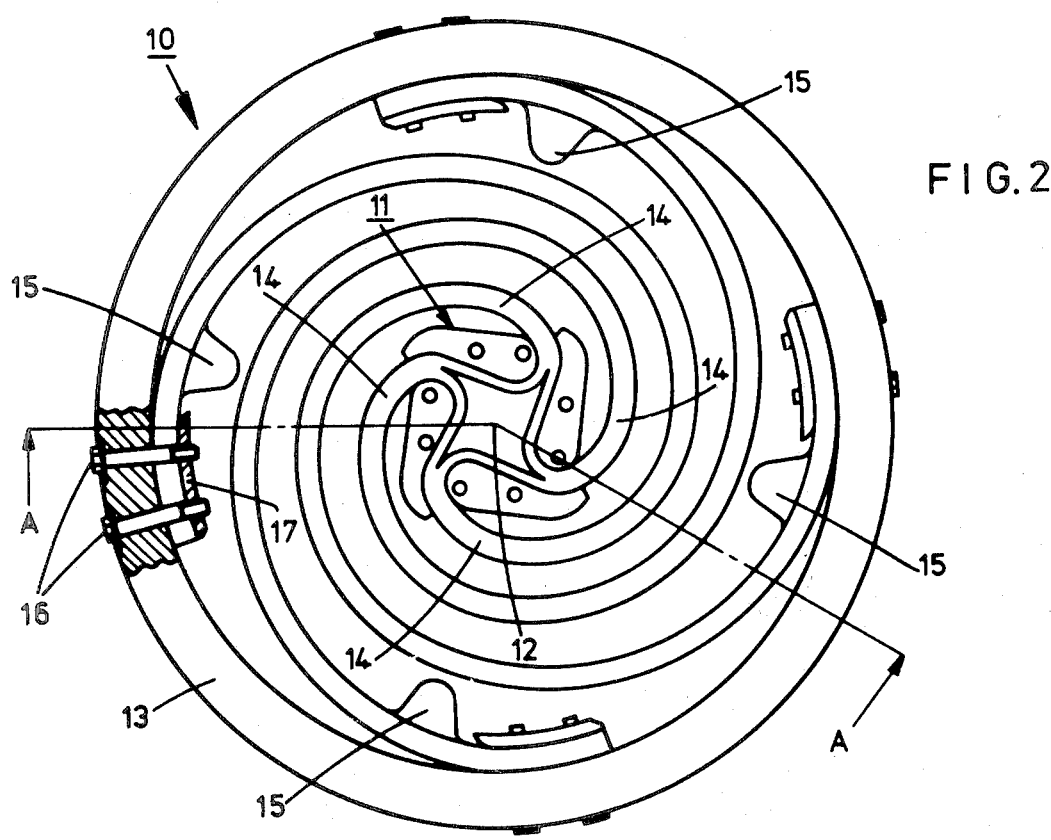
Figure 3:
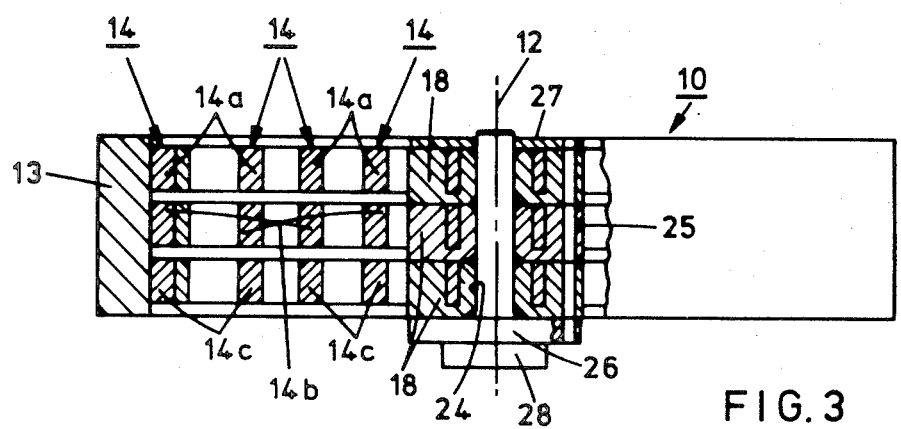
Figure 4:
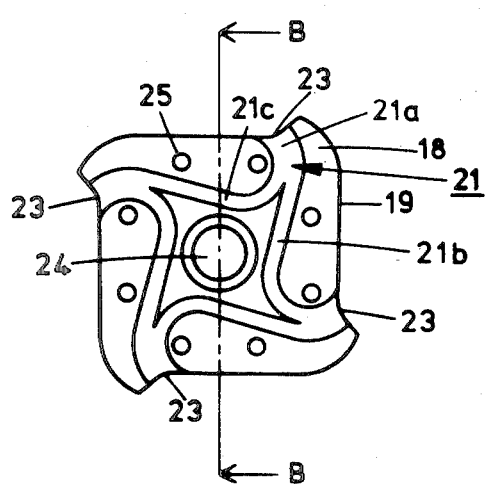
Figure 5:
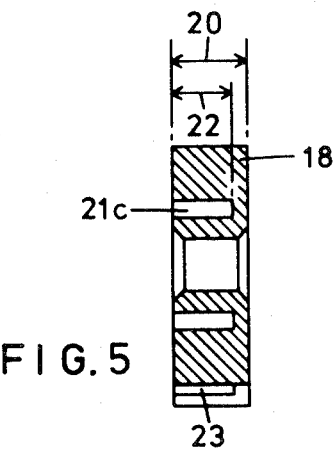

The invention will now be described by way of example only and with reference to the accompanying drawings in which:

FIG. 1 is a side elevation of a helicopter fitted with a vibration absorber constructed in accordance with the invention, FIG. 2 is a part sectioned plan view of the vibration absorber, FIG. 3 is a part sectioned side elevation of the absorber of FIG. 2 and taken along lines A—A of FIG. 2, FIG. 4 is a plan view of a detail part of the absorber of FIGS. 2 and 3, and FIG. 5 is a sectioned view taken along lines B—B of FIG. 4.

A helicopter has a fuselage 29 and a sustaining rotor system 30 arranged for rotation about a generally vertical axis 31. A vibration absorber, generally indicated at 10 is mounted above the rotor system 30 for rotation with the rotor system 30 in a plane of rotation parallel to the plane of rotation of the rotor system 30 and about the same axis 31.

Referring now to FIG. 2, the vibration absorber, generally indicated at 10, includes a hub 11 arranged during operation for rotation about an axis 12. A mass in the form of a steel ring 13 encircles the hub 11, and four resilient arms 14 equi-spaced around the hub 11 extend in a spaced-apart spiral pattern from the hub 11 to interconnect the hub 11 and the ring 13.

The arms 14 support and locate the ring 13 so that, when at rest, the ring 13 is located symmetrically of the axis 12 and, during operation, is rotated with the hub 11 in a plane of rotation perpendicular to the axis 12. The resilience and arrangement of the arms 14 ensure that the ring 13 is capable of equal resilient deflection in any direction within its plane of rotation.

In the illustrated embodiment the arms 14 are constructed of unidirectional glass fibre-reinforced plastics material, and an outer end of each arm 14 is secured to the ring 13 by two bolts 16, located through holes in the ring 13 and the end of the arm 14, and screwed into a clamping plate 17.

The inner end of each of the arms 14 is bifurcated and extended through the hub portion 11 to join with the inner ends of the neighbouring arms in a manner such that the glass fibres of the neighbouring arms are continuous, thereby providing a strong assembly. This is admitted by the provision of a light alloy hub centre 18 (FIGS. 4 and 5) having a generally square peripheral shape 19 and a thickness dimension indicated at 20.

Four slots generally indicated at 21 are machined in one surface of the hub centre 18, and extend through a depth indicated at 22 that is less than the thickness dimension 20. Each slot 21 has an opening 23 in the periphery 19 of the hub centre 18, the openings 23 being arranged symmetrically and being of a width substantially equal to the width of each arm 14. The slot 21 extends into the hub centre 18 from each opening 23 through a full width portion 21a and is then sub-divided into two slotted portions 21b and 21c each having a width dimension equal to one half of the thickness dimension of each portion 21a. The slotted portions 21b and 21c extend within the hub centre 18 to join with the full width portions 21a at adjacent openings 23. In this manner it will be appreciated that the unidirectional fibres of each arm 14 are joined with the fibres of its two neighbouring arms 14 to facilitate manufacture and provide a strong assembly.

The hub centre 18 has a central axial hole 24 and a ring of eight symmetrical axially arranged equi-spaced holes 25 for a purpose to be hereinafter fully explained.

Referring again to FIG. 2, the vibration absorber 10 includes amplitude limiting means in the form of four snubbers 15. The snubbers 15 are equi-spaced and located symmetrically of the axis 12 and arranged one on each arm 14 and slightly inboard of its attachment to the ring 13. Each snubber 15 comprises a rubber block fixedly attached to its associated arms 14 and extending inwardly to terminate at an inner edge that, in the position of rest, is spaced-apart from an outer surface of the adjacent arm 14.

In FIG. 3 it will be seen that, in the embodiment being described, each arm 14 comprises a superimposed stack of three layers 14a, 14b and 14c, extending from individual hub centres 18 and connected to a common ring 13 in the manner previously described.

A flanged location spigot 26 is fitted through the central apertures of the three hub centres 18, the flange being provided with a ring of holes corresponding to the holes 25 through the hub centres 18. An upper clamping plate 27 (omitted from FIG. 2 for clarity) is located over a protruding end of the spigot 26 and is also provided with corresponding holes, thereby facilitating clamping of the assembly by a ring of eight bolts (not shown).

A boss 28 is provided at the lower end of the spigot 26 concentric of the axis 12 and provides a location for the absorber 10 by mating with a complementary recess in the helicopter rotor 30, and the ring of eight bolts is utilised also to attach the absorber 10 to the rotor 30.

In the design of the vibration absorber 10 it is necessary firstly to estimate the forces that it is required to generate, and the vibration frequencies to be encountered, so that an appropriate mass for the absorber ring 13 can be estimated. The number and stiffness of the springs supporting the ring and constituted by the arms 14 to provide the correct frequency and amplitude of ring motion to provide the required forces can then be calculated.

The variables to be considered in the construction of the arms 14 are:
1. the number of arms,
2. the material used,
3. the length of each arm,
4. the overall radius of the absorber 10 and consequently, in view of 3 above, the rate at which each arm wraps around the centre,
5. the thickness of the arms, and
6. the depth of the arms.

Based upon material properties (Youngs Modulus, allowable stress limits and density) and manufacturing considerations, a suitable material and the number of arms is selected; in the embodiment shown, there are four arms constructed of unidirectional glass fibre-reinforced plastics material.

Knowing the clearance required between the arms 14 to permit ring movements of a required amplitude and the number of arms, and making an estimate of the required thickness of each arm 14, a maximum rate of wrap about the axis 12 can be determined. It has been found that increasing the rate of wrap of the arms tends to decrease the parasitic weight and overall radius of the device for a given performance.

Having determined a suitable rate of wrap and length for each arm 14, the exact thickness and depth of the arms 14 can be calculated to provide the required stiffness and satisfactory stress limits.

The solution with the most desirable properties, i.e. minimum parasitic weight, minimum overall radius and an acceptable depth is chosen from the family of possible solutions resulting from the above calculations.

The in-plane stiffness, and the stress distribution due to in-plane motion, depends only upon the total depth of the arms and not the number of superimposed layers. Thus, one layer of depth "d" has the same in-plane properties as two layers of depth "d/2". It should be noted that this is not, however, true for out-of-plane motion of the ring, i.e. translation and rotation of the ring with respect to the hub (e.g. vertical translation and pitch and roll motions), for which the stiffness decreases as the number of layers is increased, for a constant total arm depth.

Both axial and in-plane translational frequencies are independent of the distribution of mass in the ring 13, but the torsion and out-of-plane rotation—e.g. pitch and roll—frequencies will depend on this distribution. This is true whether the mass is in the form of a simple ring 13 or comprises, for example, a dome or dish consisting of a ring with a plate across the top. However, in all cases it is important that the ring 13 is effectively rigid.

By utilising the information outlined above, it is possible to construct the absorber so that it has required responses to various in-plane and out-of-plane vibration frequencies.

For instance, the absorber 10 shown in the drawings includes, for a particular application, a steel ring 13 having an outside diameter of 18 inches, an internal diameter of 15.540 inches and a depth of 4 inches. Glass fibre-reinforced fabric material was chosen for the arms 14, mainly for its light weight and ease of manufacture, and it was decided that four arms would be required each having an effective length of 25 inches, a thickness of 0.536 inches and a total depth of 3 inches. The vertical stacked arrangement of three layers shown in FIG. 3 was chosen to facilitate ease of manufacture of the arms 14 which, consequently, each have a depth of 1 inch to provide the overall depth of 3 inches. In this respect it is worth noting, however, that this type of stacked construction has other advantages in that it provides an opportunity to adjust the relative stiffnesses in adjacent layers by rotating one relative to another in order to average out errors in the overall assembly.

In extending between the hub 11 and ring 13, each arm is spirally wrapped around the axis 12 through an operational angle of approximately 300°.

The particular material chosen for the arms was pre-impregnated unidirectional sheets of 0.010 inches thick glass fibre material having a flexural strength of 170,000 pounds per square inch and a Modulus of $5.9 \times 10^6$ pounds per square inch.

Other materials having suitable properties, such as steel or titanium, could be used for the arms 14. However, it would be more difficult to manufacture arms in such materials, owing to machining problems, than in the composite, glass fibre-reinforced plastics, material discussed. A further advantage of using such composite material is that it tends to delaminate slowly before a final failure, thereby providing an opportunity to detect a trend to failure before it occurs. In this respect it should also be noted that, whatever material is used for the arms, a failure of one arm will result only in a detuning of the absorber, and not in its immediate destruction, because the remaining arms will accept the resulting increased loads, assuming appropriate choice of stress levels by the original design. The absorber of the present invention can, therefore, exhibit a desirable "fail-safe" characteristic.

In construction of the composite arms 14, the unidirectional glass fibres are first laid up in a female mould so as to have the same cross-sectional area as the desired finished shape, but being of reduced thickness dimension, and partly cured. This is to facilitate insertion of the arms 14 into the slot 21 in the hub centre 18 in the next phase of the operation in which the arms 14 are consolidated axially so as to be bonded to the hub centre and of the required thickness and depth.

In operation, the spiral arrangement and resilience of the arms 14 ensures that the absorber 10 operates as a sprung mass device which is capable of substantially equal resilient deflection in any direction within its plane of rotation to simultaneously cancel vibration forces of different frequencies within its plane of rotation. Appropriate tuning of the absorber 10 is accomplished at the design stage as hereinbefore described by appropriate choice of the mass of the ring 13 and of the dimensions and other properties of the flexible arms 14; fine tuning is accomplished by the provision of additional weights (not shown) located symmetrically of the axis 12.

The facility to simultaneously cancel vibration forces of different frequencies is of particular advantage to the elimination of in-plane (or horizontal) vibration forces active on a helicopter rotor. In such an installation the hub 11 of the absorber 10 is attached to the helicopter rotor 30 so that the axis 12 is co-incident with the axis of rotation 31 of the rotor 30, and so that the absorber 10 is rotated in a plane of rotation parallel to the plane of rotation of the rotor 30 (see FIG. 1). The absorber 10 is tuned in the non-rotating condition to a frequency equal to N×rotor rpm (4 R for a four-bladed rotor) at normal operating speed, so that in the rotating condition at normal operating speed it will respond at both $(n-1)$ and $(n+1)$ frequency vibrations (3 R and 5 R for a four-bladed rotor), thus producing the required longitudinal and lateral fixed direction components of the correct relative magnitude and phase in a single installation. Futhermore, unequal force vectors can be effectively cancelled with no possibility of inducing an out-of-balance force at the helicopter rotor head.

The position of the snubbers 15 in the illustrated embodiment provides an amplitude limiting device to protect the absorber from damage that may be caused by excessive deflections at rotor speeds other than the design rotor speed at which frequency the absorber is tuned. Such excessive deflections may, for example, be encountered during rotor start-up before design rotor speed is achieved.

It will be understood that the vibration absorber according to the present invention is not limited to use with a four-bladed rotor, and can be used effectively to simultaneously cancel in-plane vibration forces of both $(n-1)$ and $(N+1)$ frequencies in helicopter rotors having any number of blades.

Thus, the absorber of the present invention retains the operational advantages of our prior absorber disclosed in U.S. patent Ser. No. 3,910,720, and overcomes the problems of that absorber by eliminating all mechanical components such as springs and sliding and rolling surfaces thereby resulting in a simpler and cheaper absorber that requires less maintenance and is not subject to de-tuning due to friction and wear.

If desired, two or more vibration absorbers 10 can be arranged in a stacked assembly on the helicopter rotor 30 and can be tuned to cancel either vibrations of different frequencies or $(n-1)$ and $(n+1)$ frequency vibrations at different operating speeds, thereby extending the operational bandwidth of an overall vibration absorbing system. Furthermore, in a non-illustrated embodiment, the resilient arms may also be arranged to be resiliently flexible in a direction parallel to the axis of rotation 12, so that simultaneous cancellation or reduction of both in-plane and out-of-plane (or vertical) forces active on the helicopter rotor can be achieved.

Whilst an embodiment of the invention has been particularly described and illustrated, it will be understood that various modifications can be made without departing from the scope of the appended claims. For example, the absorber is not limited to having any particular number of arms 14; however, it is considered that a minimum of three arms is desirable for symmetry reasons. Clearly, the operational angle of the wrap of each arm about the axis can be varied to suit particular installations, although in any particular installation the angle of each arm will be constant. Other suitable fabrication techniques may be utilised in the construction of the absorber: for example, the hub 11, arms 14 and ring 13 may be formed as an integral assembly. Similarly, any suitable means may be employed to locate and attach the absorber to the helicopter rotor. The arms 14 may be constructed of other composite material such as carbon or boron fibre-reinforced material, and the fibre-reinforcement material may be of a woven type as opposed to the unidirectional type hereinbefore described. The arms 14 are not limited to being of uniform thickness throughout their lengths, but may, for instance, be thickened locally at high stress areas.

We claim as our invention:

1. A helicopter including a rotor system having a plurality of rotor blades arranged for rotation about a generally vertical axis and a translational vibration absorber arranged for rotation with the rotor for rotation about the axis of rotation, the absorber comprising a support attached to the rotor system, a mass portion encircling the axis of rotation, and a plurality of resilient arms extending in a spaced-apart sprial pattern between the support and the mass with a free end of each arm separately attached to said mass to carry said mass so that, during operation, the mass is rotated with the rotor system in a plane substantially perpendicular to the axis of rotation and is capable of substantially equal resilient deflection in any direction within its plane or rotation, the absorber being de-tuned torsionally at a selected rotor design speed and being tuned so as to have, at the selected speed, a translational or in-plane natural frequency corresponding to the frequencies at which vibration absorption is required, thereby reducing in-plane rotor induced vibrations.

2. A helicopter as claimed in claim 1, wherein the absorber has a frequency equal to $N\times$rotor rpm at the selected rotor design speed so as to reduce both $(n-1)$ and $(n+1)$ frequency vibrations.

3. A helicopter as claimed in claim 1, wherein said support includes a hub portion having slots therein and openings disposed in the periphery of the hub corresponding to the number of arms, the arm material extending through the slots in the hub and interconnecting with adjacent arms whereby all of the resilient arms are interconnected.

4. A helicopter as claimed in claim 1, wherein the arms of the absorber are constructed of fibre-reinforced plastics material.

5. A helicopter as claimed in claim 1, wherein each resilient arm comprises at least two superimposed layers arranged in a stacked assembly.

6. A helicopter as claimed in claim 5, wherein each superimposed layer extends from an individual hub centre, each hub centre having a ring of symmetrical bolt holes for attachment of the stacked hub centres to each other, and a locating spigot extending through a central aperture in each of the stacked hub centres, the locating spigot having a flange portion with a ring of bolt holes corresponding to the holes in the hub centres for securement of the spigot to the stacked hub centres.

7. A helicopter as claimed in claim 6, wherein said spigot has a location boss concentric of the axis of rotation of the absorber for location in a recess in the helicopter rotor, said ring of bolt holes providing a means of attachment of the absorber to the helicopter rotor.

* * * * *